United States Patent [19]

Foust

[11] Patent Number: 5,367,355

[45] Date of Patent: Nov. 22, 1994

[54] FLASH READY CONDITION DEPENDENT ON FOCAL LENGTH

[75] Inventor: Gregory B. Foust, Spencerport, N.Y.

[73] Assignee: Eastman Kodak Company, Rochester, N.Y.

[21] Appl. No.: 44,665

[22] Filed: Apr. 9, 1993

[51] Int. Cl.$^5$ .............................................. G03B 15/05
[52] U.S. Cl. ................................ 354/418; 354/127.11
[58] Field of Search ................ 354/418, 127.1, 127.11, 354/127.12, 127.13, 421

[56] References Cited

U.S. PATENT DOCUMENTS

| | | | |
|---|---|---|---|
| 4,027,317 | 5/1977 | Hauser et al. | 354/289 |
| 4,124,857 | 11/1978 | Hauser et al. | 354/198 |
| 4,135,797 | 1/1979 | Ohmura et al. | 354/128 |
| 4,214,827 | 7/1980 | Tominaga et al. | 354/127 |
| 4,259,615 | 3/1981 | Kashihara et al. | 354/127 |
| 4,464,039 | 8/1984 | Ishida | 354/418 |
| 4,470,684 | 9/1984 | Harvey | 354/413 |
| 4,486,086 | 12/1984 | Kresock | 354/418 |
| 4,799,078 | 1/1989 | Hayama | 354/412 |
| 5,109,244 | 4/1992 | Otani et al. | 354/127.11 |

Primary Examiner—Russell E. Adams
Attorney, Agent, or Firm—David A. Howley

[57] ABSTRACT

A photographic camera including a plurality of focal length settings, a chargeable flash device, and a mechanism for indicating an exposure ready condition at a predetermined state of charge, is characterized by means responsive to the focal length setting for adjusting the predetermined state of charge at which the ready condition is indicated. The state of charge is more complete at longer focal lengths to ensure sufficient illumination and is less complete at shorter focal lengths to reduce wait time. According to one feature of the invention, the camera includes contact elements having a plurality of discrete positions, one each representing a different focal length, and the predetermined state of charge is adjusted depending on the position of the contact elements. The flash ready condition may be signaled by a number of different mechanisms including, for example, flash ready lights, the extinguishment of exposure wait lights, and the release of actuation interlocks.

7 Claims, 5 Drawing Sheets

FLASH READY CONDITION DEPENDENT ON FOCAL LENGTH

BACKGROUND OF THE INVENTION

1. Field of Invention

The present invention relates to the field of photography and more specifically to cameras with multiple focal lengths adapted to handle automatically a wide range of exposure conditions, some requiring flash. Still more specifically, the invention addresses difficulties encountered with flash photography at longer focal lengths in cameras that also must perform to users expectations at shorter focal lengths.

2. Description of the Prior Art

It is well known in automatic cameras to vary flash intensity with the distance to a subject. Harvey U.S. Pat. No. 4,470,684, issued on Sep. 11, 1984, for example, discloses a camera having a range finder for determining the subject distance, and a control that limits charging of an electronic flash device according to such distance. The control saves battery power and shortens the wait time between exposures whenever the distance is shorter than the maximum capabilities of the flash. Approaches of this type provide important advantages to photographers, but do not address other problems that result from changes in focal length not necessarily dependent on distance.

Although not common, it is known also to sense focal length, and to warn of conditions that are likely to result in blurred images. Hauser et al U.S. Pat. No. 4,124,857, issued on Nov. 7, 1978, is one example. The Hauser patent discloses a camera that energizes a warning light in the viewfinder when the focal length exceeds a predetermined value likely to result in blurred images. The warning light is deactivated when measures are taken to reduce the risk. The Hauser approach recognizes design difficulties in cameras with multiple focal lengths, but requires operator intervention under those conditions most likely to result in poor photographs.

PROBLEM SOLVED BY THE INVENTION

The present invention addresses difficulties encountered in designing automated cameras having multiple focal lengths and flash capability. Many cameras today energize the flash ready light, or other indication of readiness, when the flash is only partly charged, typically halfway in the charging cycle. This reduces wait time and energy usage in a manner that is satisfactory at shorter focal lengths, but may result in insufficient illumination at longer focal lengths. Other cameras delay the indication of flash readiness until the charging cycle is nearly complete. This reduces the risk of insufficient illumination at the longer focal lengths, but increases the wait time at shorter focal lengths.

SUMMARY OF THE INVENTION

The present invention is directed to overcoming one or more of the problems set forth above. Briefly summarized, a photographic camera, including a plurality of focal length settings, a chargeable flash device, and a mechanism for indicating an exposure ready condition at a predetermined state of charge, is characterized by means responsive to the focal length setting for adjusting the predetermined state of charge at which the ready condition is indicated. The state of charge is more complete at longer focal lengths to ensure sufficient illumination and is less complete at shorter focal lengths to reduce wait time.

According to one feature of the invention, the camera includes contact elements having a plurality of discrete positions, one each representing a different focal length, and the predetermined state of charge is adjusted depending on the position of the contact elements. The flash ready condition may be signaled by a number of different mechanisms including, for example, flash ready lights, the extinguishment of exposure wait lights, and the release of actuation interlocks.

ADVANTAGEOUS EFFECTS OF THE INVENTION

The invention retains the advantages of short wait times and reduced energy usage at short focal lengths while increasing the probability of improved flash performance at longer focal lengths. Operation is automatic and does not require the camera operator to understand the principals involved, or even recognize the existence of the problem.

These and other aspects, objects, features and advantages of the invention will be more clearly understood and appreciated from a review of the following detailed description of the preferred embodiments and appended claims, and be reference to the accompanying drawings.

DESCRIPTION OF THE PREFERRED EMBODIMENTS

The invention is described with a photographic still camera of the type presented in U.S. patent application Ser. No. 08/024033, filed on Mar. 1, 1993, in the name of Peter Labaziewicz. The disclosure of the Labaziewicz Application hereby is incorporated by reference into the present application.

Figure 1:
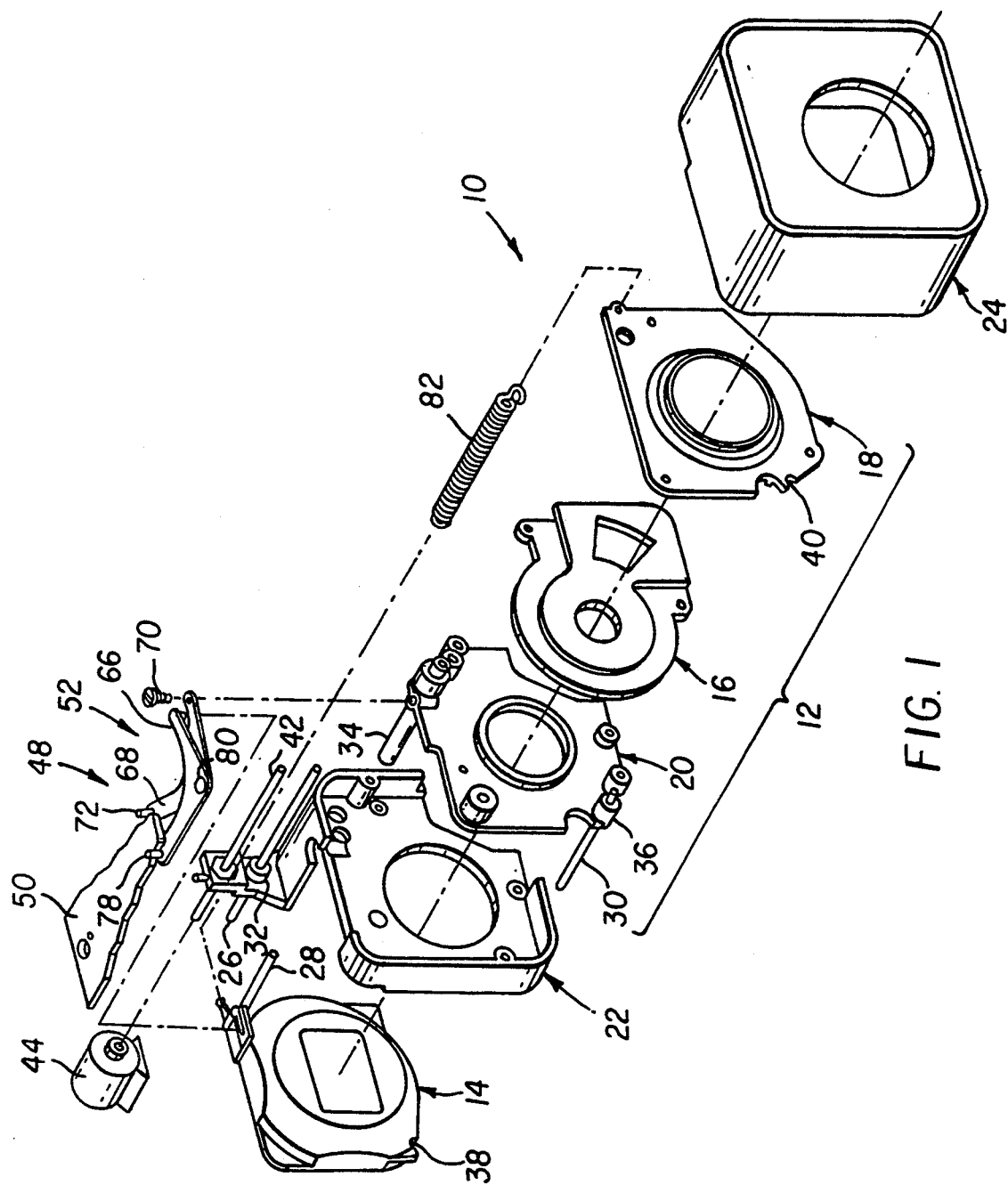
FIG. 1 is an exploded view of a camera portion including a zoom lens or multi focal-length optical system particularly well suited for use with the present invention.
Figure 2:
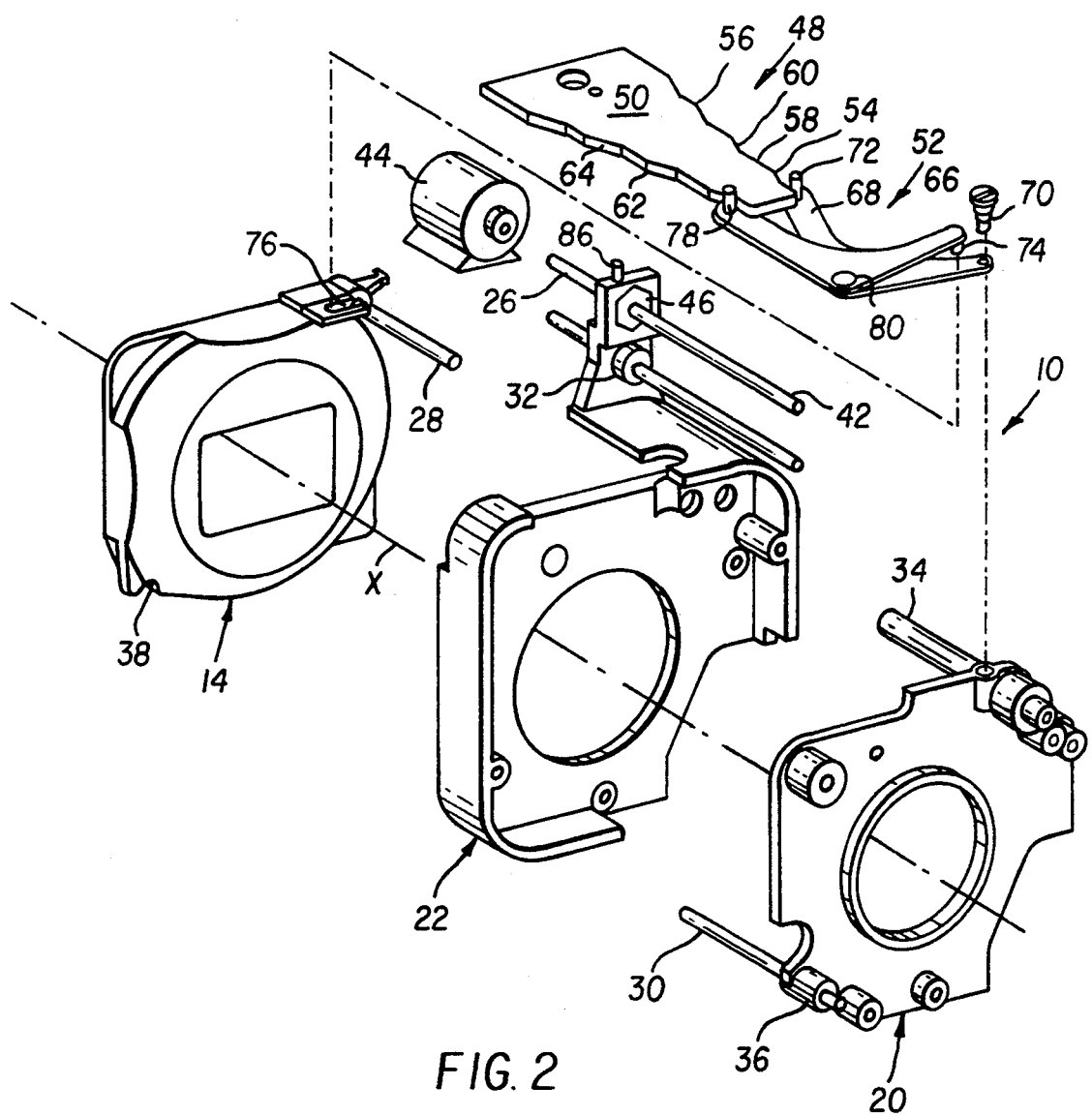
FIG. 2 is an exploded view of a portion of the zoom lens system of FIG. 1, showing in more detail the mechanism for establishing a plurality of focal lengths.

Referring now to FIGS. 1 and 2, an optical system in the form of a zoom lens 10 is depicted including first or front and second or back lens groups 12 and 14, respectively, disposed for relative movement along an optical axis X. The first lens group 12 includes a shutter assembly 16, a front lens retainer 18, and a rear lens retainer 20, all assembled within a lens housing 22 and lens cover or barrel 24 for movement as a group along the optical axis. The second lens group 14 is moveable relative to the first lens group for adjusting the focal length of the system, while both groups are moveable relative to the film plane for adjusting focus.

The first and second lens groups 12 and 14 can include any number of appropriate combinations of lens elements interposed with shutter and other assemblies suitable for photographic exposures. It also will be apparent that other stationary and moveable groups of optical and related elements can be provided in cooperation with the first and second groups 12 and 14 along the same optical axis.

The first and second lens groups are maintained in alignment perpendicular to the film plane, are prevented from rotating, and are mounted for lengthwise movement along the optical axis by a plurality of parallel guide rods and anti-rotation shafts 26, 28, and 30. Main shaft 26 is secured to the camera body (not shown), and extends through a bushing 32 in housing 22 for aligning the first lens group 12 relative to the camera body and film plane (not shown). Shaft 28 extends from the second lens group 14 through an aperture in housing 22 and into a sleeve 34 in the first lens group 12 for maintaining proper alignment of the second lens group 14 relative to the first lens group 12. Shaft 30 extends from a boss 36 in the first lens group 12 through the housing 22 and against a notch 38 in the second lens group 14 to prevent rotation of the second lens group 14 relative to the first lens group 12. The end of the anti-rotation shaft adjacent retainer 18 is accommodated by a notch 40 in the retainer.

Longitudinal movement of the first lens group 12 along the optical axis X is provided through a lead screw 42 under control of a motor 44. The lead screw is coupled to housing 22 through a threaded nut 46 (FIG. 2) that translates rotary movement of the lead screw into longitudinal movement of the housing and the first lens group assembled therewith. The second lens group 14, on the other hand, except for the control mechanism described hereinafter, is moveable independently of the first lens group along shafts 28 and 30.

The focus adjustment and focal length selection for the optical system are varied by a control device 48 which extends between and is coupled to the first and second lens groups 12 and 14. The control device includes a cam and cam follower mechanism 50 and 52, respectively, for changing the focal length of the optical system by communicating relative axial displacement to said second lens group in response to axial movement of said first lens group. The cam and follower mechanism includes a plurality of cam steps depicted at 54, and 56, each having a dwell cam surface 58 extending parallel to the optical axis, and a ramped cam surface 60, extending at an angle to the optical axis. The dwell cam surface accommodates axial movement of said first lens group without changing the relative displacement between the lens groups and thereby permits focusing of the optical system between at least two focus positions at a fixed focal length. The ramped cam surface displaces the second lens group relative to the first lens group in response to movement of the first lens group along the optical axis, and thereby changes the focal length of the optical system.

The cam and follower mechanism also includes a second plurality of cam steps 62 and 64 that are essentially mirror images of the steps 54 and 56 to define opposed pairs of cam steps, where each pair includes dwell cam surfaces that extend parallel to each other and to the optical axis, and ramped cam surfaces that extend at an angle relative to each other and the optical axis.

Referring now in more detail to the elements that make up the cam and follower mechanism, the cam follower 52 includes first and second linkages in the form of L-shaped members 66 and 68. The first L-shaped member 66 includes one end pivotally coupled to the front lens group 12 through a pin 70, and another end having a cam follower in the form of a pin 72. The second L-shaped member 68 has one end coupled to the second lens group 14 through a pin 74 and slot 76 (FIG. 2), permitting translational movement there between. Another end of second L-shaped member 68 includes a cam follower in the form of a pin 78. The first and second L-shaped members form a scissors linkage coupled in their center sections by a floating pivot 80.

The cam followers 72 and 78 are urged under the influence of spring 82 (FIG. 1) into engagement with the opposed cam surfaces of cam 50 for controlling a number of important optical functions. These functions will be described in connection with the operation of the cam and follower mechanism which follows.

The focal length is set first by selective operation of motor 44 to rotate lead screw 42, operating through nut 46, to translate the rotary motion of the lead screw into movement of the first lens group along optical axis X. During this initial travel of the first lens group, the first and second cam followers 72 and 78 are ramped apart by divergent cam surfaces that are angled away from each other and relative to the optical axis. This ramping movement spreads the cam followers and pivots the scissors linkage 66 and 68 apart, thereby displacing the second lens group relative to the first lens group. Both groups move along the same axis, but by a different amount, thereby changing the focal length. After selection of a discrete focal length, the focus can then be adjusted using the very same motor, lead screw and mechanism to shift the first lens group so cam followers 72 and 78 transverse the cam sections that are parallel to each other and the optical axis. Such movement does not change the separation of the cam followers or the relative displacement between the first and second lens groups and, therefor, does not change the focal length of the optical system, It does, however, change its focus, permitting two or more focus settings for each discrete focal length. Such a cam and follower mechanism can be utilized to accomplish a number of different valuable objectives. Some are described in the previously mentioned Labaziewicz application, and still others will be apparent from this description to those skilled in the art.

Figure 3:
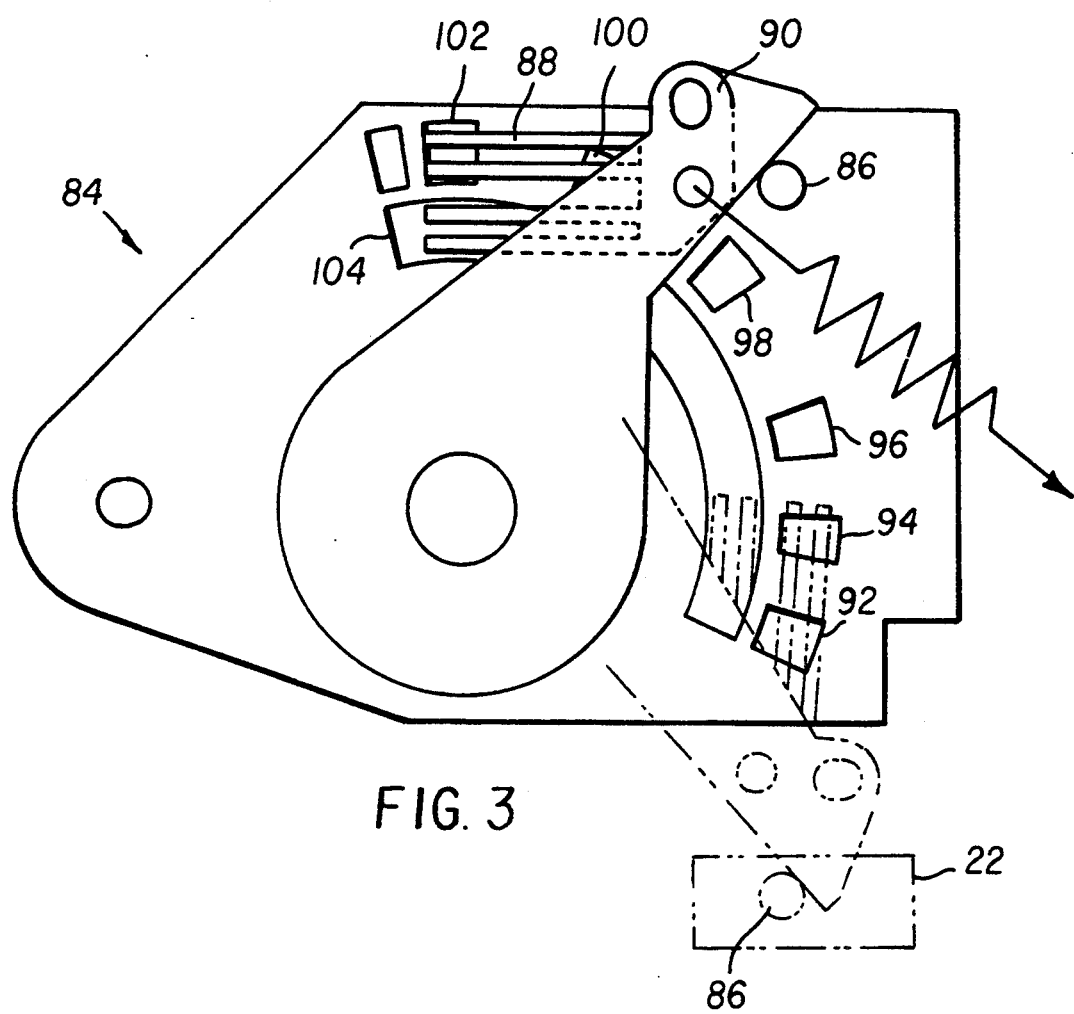
FIG. 3 is a bottom plan view of a multi-position switch assembly showing contact elements, one each associated with the respective focal length positions of the zoom lens depicted in FIGS. 1 and 2.

Referring now to FIG. 3, a switch control assembly 84 is depicted for sensing and controlling the relative position of the first lens group 12 as it moves between a wide-angle position, depicted in solid lines in FIG. 3, and a telephoto position, depicted in phantom in FIG. 3. A pin 86, carried by housing 22 moves with the first lens group 12 during changes in its position along optical axis X. During such movement the pin engages and sweeps contacts 88, on pivotal arm 90, across a plurality of switch pads 92, 94, 96, 98, 100, and 102, for establishing electrical connections between such switch pads and a grounding strip 104. Each switch pad represents a desired position along the optical axis of the first lens group and cooperates with appropriate electrical mechanisms in the camera body (not shown) and motor 44 to establish the first lens group in each desired position. The dimensions of the respective pads also can be chosen in cooperation with the dwell and ramp surfaces 58 and 60 of the cam and follower mechanism 48 and 50 to facilitate the operation already described.

Figure 4:
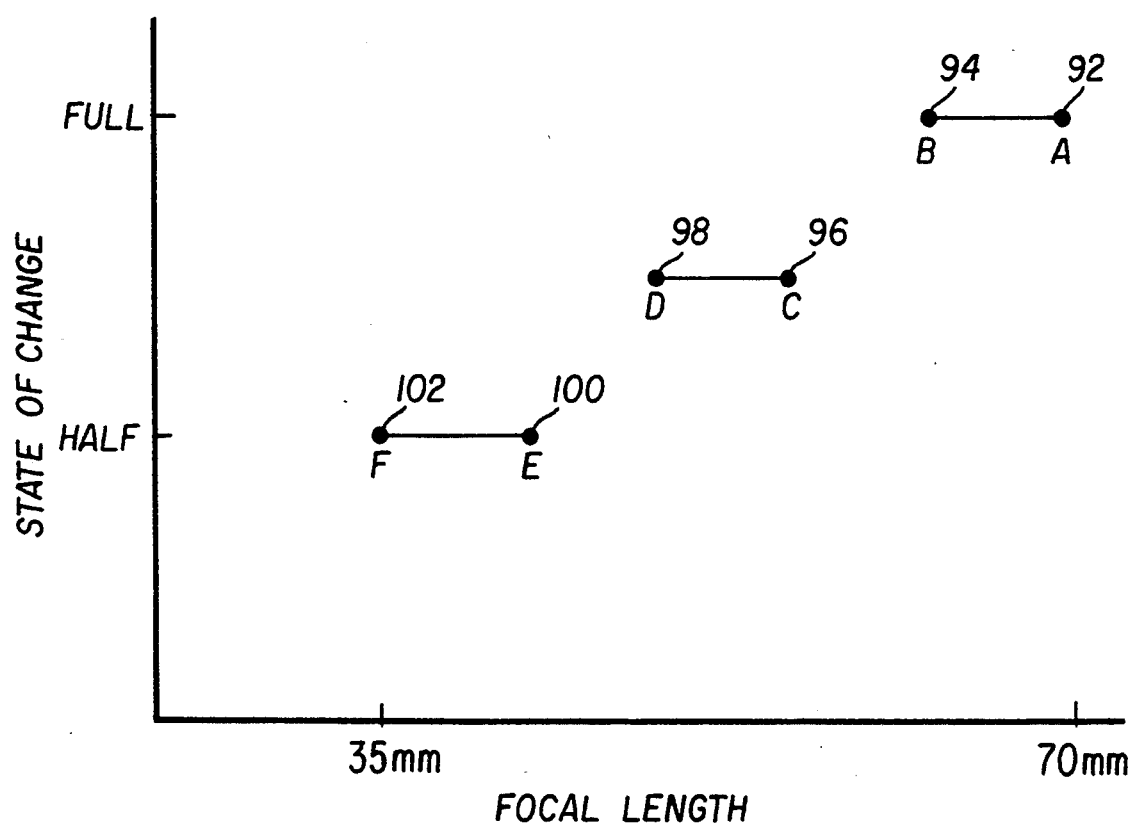
FIG. 4 is a graph comparing a focal length setting with a state of charge at which a flash ready condition is indicated; and, FIG. 5 is a schematic representation of a control mechanism including a flash ready indicator adjustable in accordance with a focal length setting.
Figure 5:
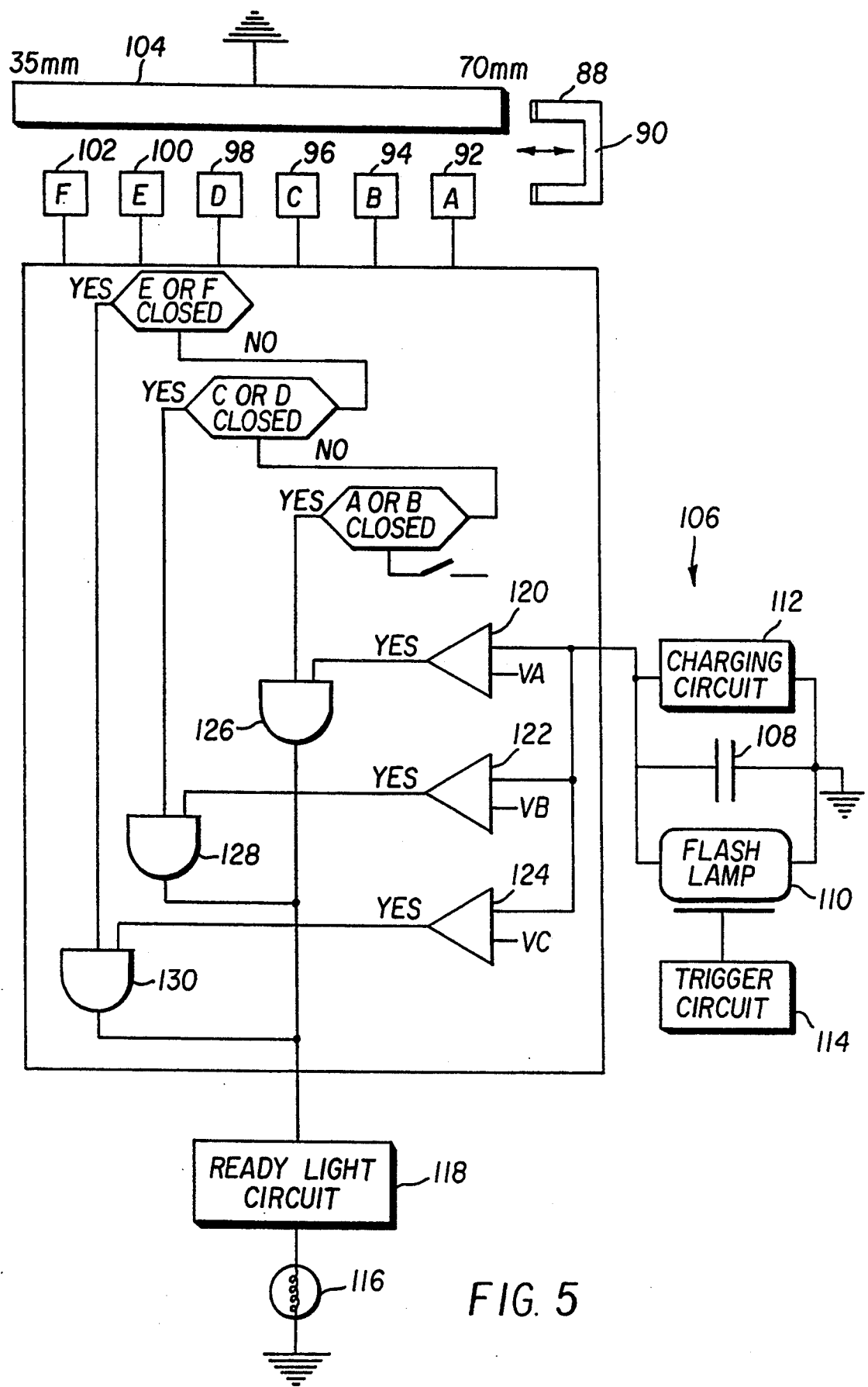

Referring now to FIGS. 4 and 5, the camera includes an electronic flash device 106, having a capacitor 108, a photoflash lamp 110, charging and trigger circuits 112 and 114, respectively, and a flash ready light 116 energized selectively by a circuit 118. The charging circuit 112, which is coupled to a suitable source of power, is activated to initiate charging of capacitor 108. When the charge on the capacitor builds to a suitable level, ready light circuit 118 energizes the flash ready light 116 to indicate to the camera operator that the flash device is ready for operation to provide illumination in support of an exposure. At the appropriate time after initiation of an exposure sequence by the camera operator, trigger circuit 114 fires the flash, and the capacitor 108 discharges through photoflash lamp 110, providing the illumination.

At short focal lengths, it is desirable to energize the flash ready light before the capacitor is fully charged. Less illumination is required when the camera is set to one of the shorter focal lengths, and an early ready light reduces wait time, an important feature, particularly when battery power is low. This advantage may be foregone, however, in cameras that also are intended for use at longer focal lengths, because relatively more illumination is required, even at the same subject distance. At the longer focal lengths, a full charge on the capacitor often is a more important design consideration than reduced wait time.

In accordance with the present invention both advantages are attained. At shorter focal lengths the flash ready light is energized before full charge of the capacitor. At longer focal lengths, energization of the ready light is delayed for more complete or full charge of the capacitor. FIG. 4 depicts this aspect by displaying three ranges. A first range A–B corresponding to long focal lengths where the ready light is illuminated at substantially full charge of the capacitor. The second range C–D corresponds to intermediate focal lengths and the ready light is illuminated at substantially three quarter charge. The third range E–F corresponds to short focal lengths and the flash ready light is illuminated at substantially half charge of the capacitor.

Referring to FIGS. 3 and 5, mechanisms are provided for adjusting the flash ready light for illumination selectively at a state of capacitor charge which is dependent on the cameras focal length setting. At the longer focal lengths, represented by pads A and B, which correspond to the electrical pads 92 and 94 in FIG. 3, the state of charge is compared by comparator 120 to a voltage A corresponding to full capacitor charge. At intermediate focal length settings, represented by pads C and D, corresponding to electrical pads 96 and 98 in FIG. 3, the state of charge is compared by comparator 122 to a voltage B corresponding to a three quarters capacitor charge. At the shorter focal lengths, represented by pads E and F, which correspond to the electrical pads 100 and 102 in FIG. 3, the state of charge is compared by comparator 124 to a voltage C corresponding to a half capacitor charge. "And" gates 126, 128, and 130 determine which comparison is made depending on which contact, A, B, C, D, E, or F is closed by contacts 88 of arm 90 (FIG. 3). If switch E (100) or F (102) is closed, the flash ready light will be illuminated when the level of charge of capacitor reaches a level corresponding to reference voltage C. When switch A (92), or B (94) is closed, on the other hand, the ready light will not illuminate until the charge on capacitor 108 reaches full charge corresponding to reference voltage A.

It should be evident from the foregoing description that the invention is not limited to the particular details of the preferred embodiment. Although a flash ready light is employed in the preferred embodiment, other indicators of readiness may be employed. A flash wait light, operating essentially the opposite of a ready light, or a shutter enabling or disabling device are but a few other examples. It therefore is contemplated that the claims should be interpreted to cover other modifications and applications that do not depart from the true spirit and scope of the invention.

| PARTS LIST FOR FIGURES | |
|---|---|
| Reference No. | Part |
| 10 | Zoom lens. |
| 12 | Front lens group. |
| 14 | Back lens group. |
| 16 | Shutter assembly. |
| 18 | Front lens retainer. |
| 20 | Rear lens retainer. |
| 22 | Lens housing. |
| 24 | Lens barrel. |
| 26 | Main shaft. |
| 28 | Shaft. |
| 30 | Shaft. |
| 32 | Bushing. |
| 34 | Sleeve. |
| 36 | Boss. |
| 38 | Notch. |
| 40 | Notch. |
| 42 | Lead screw. |
| 44 | Motor. |
| 46 | Threaded nut. |
| 48 | Control device. |
| 50 | Cam. |
| 52 | Cam follower. |
| 54 | Cam step. |
| 56 | Cam step. |
| 58 | Dwell cam surface. |
| 60 | Ramped cam surface. |
| 62 | Cam step. |
| 64 | Cam step. |
| 66 | L-shaped member. |
| 68 | L-shaped member. |
| 70 | Pin. |
| 72 | Pin. |
| 74 | Pin. |
| 76 | Slot. |
| 78 | Pin. |
| 80 | Floating pivot. |
| 82 | Spring. |
| 84 | Switch control assembly. |
| 86 | Pin. |
| 88 | Contacts. |
| 90 | Pivotal arm. |
| 92 | Switch pad. |
| 94 | Switch pad. |
| 96 | Switch pad. |
| 98 | Switch pad. |
| 100 | Switch pad. |
| 102 | Switch pad. |
| 104 | Grounding strip. |
| 106 | Electronic flash device. |
| 108 | Capacitor. |
| 110 | Photoflash lamp. |
| 112 | Charging circuit. |
| 114 | Trigger circuit. |
| 116 | Ready light. |
| 118 | Ready light circuit. |
| 120 | Comparator. |
| 122 | Comparator. |
| 124 | Comparator. |
| 126 | And gate. |
| 128 | And gate. |
| 130 | And gate. |

What is claimed is:

1. A photographic camera having optical elements adjustable for setting a plurality of focal lengths, a chargeable flash device for illuminating a subject, and a signaling mechanism for indicating an exposure ready condition when the flash device reaches a predetermined state of charge; characterized in that:

said camera includes means for adjusting said predetermined state of charge in response to said focal length setting.

2. The invention according to claim 1, wherein said adjusting means increases said predetermined state of charge for longer focal lengths compared to said predetermined state of charge for shorter focal lengths.

3. The invention according to claim 2, wherein said predetermined state of charge for a shorter focal length is set for substantially half full charge and a predetermined state of charge for a longer focal length is substantially full charge.

4. A camera according to claim 1, including contact elements having a plurality of discrete positions one each representing a different focal length, wherein said signaling mechanism is a flash-ready light, and said predetermined state of charge is adjusted depending on the position of said contact elements.

5. A photographic camera comprising:

a zoom lens including optical elements moveable between long focal length positions and short focal length positions;

an contact member moveable with said moveable optical elements between a first contact position representing said long focal length and a second contact position representing said short focal length;

a flash device including means for accumulating electrical charge for discharging said flash device; and, means for setting said flash device in accordance with the position of said contact member to accumulate more electrical charge in said first contact position compared to said second contact position.

6. A camera according to claim 5, including a plurality of conductive pads one each representing a different focal length, and wherein said contact member is an electrical contact moveable into engagement with said pads by axial movement of said optical elements.

7. A camera according to claim 6, wherein said pads and contact member also control the position of said optical elements for setting the focal length of the zoom lens.

* * * * *